(12) United States Patent
Buck et al.

(10) Patent No.: US 7,121,854 B2
(45) Date of Patent: Oct. 17, 2006

(54) SLIDE TYPE BATTERY EJECTION MECHANISM

(75) Inventors: William C. Buck, Clemson, SC (US); Kenneth M. Brazell, Piedmont, SC (US); Chris Lewis, Anderson, SC (US); Taku Ohi, Greer, SC (US); George Michael Hornick, Anderson, SC (US); Feng Kun Lu, Liu Zhou (CN); Xiao Ping Liu, Nan Chang (CN)

(73) Assignee: Eastway Fair Company Limited, Tortola (VG)

( * ) Notice: Subject to any disclaimer, the term of this patent is extended or adjusted under 35 U.S.C. 154(b) by 0 days.

(21) Appl. No.: 11/041,538

(22) Filed: Jan. 24, 2005

(65) Prior Publication Data

US 2005/0130034 A1  Jun. 16, 2005

Related U.S. Application Data

(63) Continuation-in-part of application No. 10/447,064, filed on May 28, 2003, now Pat. No. 6,955,549, and a continuation-in-part of application No. 10/739,260, filed on Dec. 18, 2003.

(51) Int. Cl.
*H01R 13/62* (2006.01)
(52) U.S. Cl. .................................... 439/160
(58) Field of Classification Search ........ 439/152–155, 439/160
See application file for complete search history.

(56) References Cited

U.S. PATENT DOCUMENTS

| | | | |
|---|---|---|---|
| 3,734,207 A | 5/1973 | Fishbein | |
| 4,091,880 A | 5/1978 | Troutner et al. | |
| 4,580,192 A | 4/1986 | Beun | |
| 5,172,043 A | 12/1992 | Toops | |
| 5,202,197 A | 4/1993 | Ansell et al. | |
| 5,208,525 A | 5/1993 | Lopic et al. | |
| 5,298,821 A | 3/1994 | Michel | |
| 5,340,340 A | 8/1994 | Hastings et al. | |
| 5,535,437 A | 7/1996 | Karl et al. | |
| 5,553,675 A | 9/1996 | Pitzen et al. | |
| 5,580,182 A | 12/1996 | Lin | |
| 5,620,242 A | 4/1997 | Leon et al. | |
| 5,621,301 A | 4/1997 | Allen et al. | |
| 5,663,011 A | 9/1997 | Bunyea et al. | |
| 5,671,815 A | 9/1997 | Kabatnik et al. | |
| 5,677,827 A | 10/1997 | Yoshioka et al. | |
| 5,741,305 A | 4/1998 | Vincent | |
| 5,764,477 A | 6/1998 | Ohgami et al. | |
| 5,816,121 A | 10/1998 | Yoshimizu et al. | |
| 5,997,323 A | 12/1999 | Youn | |
| 6,047,572 A * | 4/2000 | Bliven et al. ................. 70/58 |
| 6,102,632 A | 8/2000 | Potter et al. | |
| 6,168,881 B1 | 1/2001 | Fischer et al. | |
| 6,191,941 B1 | 2/2001 | Ito et al. | |
| 6,216,195 B1 * | 4/2001 | Lee et al. ................. 710/303 |

(Continued)

*Primary Examiner*—Neil Abrams
(74) *Attorney, Agent, or Firm*—Brinks Hofer Gilson & Lione; G. Peter Nichols

(57) ABSTRACT

A battery ejection mechanism for ejecting a battery housing removably attached to an electrical device housing. The mechanism includes at least two ejection members, each having a button and an arm. The arms are adapted to transfer a force applied on the buttons to the electrical device housing to provide a pushing force for ejection of the battery pack from the electrical device housing. Force on the buttons also causes associated latches on the battery pack to move to their release position.

12 Claims, 12 Drawing Sheets

U.S. PATENT DOCUMENTS 6,233,141 B1  5/2001  Lee et al.
6,412,572 B1  7/2002  Habedank et al.
6,894,893 B1 *  5/2005  Hidesawa .................. 361/683
2002/0089306 A1  7/2002  Rozwadowski et al.

* cited by examiner

SLIDE TYPE BATTERY EJECTION MECHANISM

The present application is a continuation-in-part of U.S. Pat. No. 6,955,549 filed May 28, 2003 and a continuation-in-part of U.S. Ser. No. 10/739,260 filed Dec. 18, 2003, the entire contents of both are incorporated herein by reference.

BACKGROUND

The present invention relates generally to battery packs, battery operated devices, battery chargers, and methods for their use. The invention may find particular use in slide type battery packs having a plurality of cells. In particular, the present invention relates to mechanisms for ejecting detachable battery packs from battery operated devices as well as from the chargers used to re-charge the batteries.

Electrical power tools, such as drills, screwdrivers, saws, etc., are in widespread use. While these tools can be powered by an AC power source using an electrical cord, battery operated tools offer operators greater mobility. Battery operated tools also eliminate the need for extension cords, which can be quite cumbersome. Battery operated devices, however, have limitations. The batteries can hold a limited amount of electrical power before they need to be recharged. To alleviate this problem, power tool manufacturers developed more powerful packs. As a result, battery packs have become large and heavy. This increase in weight has led manufacturers of battery operated power tools to develop locking mechanisms that secure these large, heavy battery packs in electrical contact with the power tool. Unfortunately, the larger and heavier the battery pack, the stronger the locking mechanism. To change the battery pack for recharging, the operator must first disable the locking mechanism and then separate the battery pack from the power tool. Because the pack is large and heavy, there is a need to assist a power tool user in separating the battery pack from the power tool. Similarly, when the battery is placed onto a battery charger, there is a need to assist the power tool user in separating and removing the battery pack from the charger.

U.S. Pat. No. 6,412,572 shows a battery ejection mechanism where a spring is used to apply a force to the battery pack to assist a user separating the two. This approach has limitations. First, the user must compress the spring when connecting the battery. The user must apply a sufficient force to compress the spring enough for the spring to apply a large enough force to provide real assistance in the removal of these large, heavy battery packs. Thus, the effort saved by providing assistance with the removal of the battery is negated by the effort required to compress the spring when attaching the battery to the tool. Further, the spring applies a force against the battery as the operator attempts to attach the battery. This force acts to directly oppose the efforts of the operator. The battery ejection mechanism of the present invention addresses these and other problems of the art.

SUMMARY

In one aspect of the present invention, a battery ejection mechanism for ejecting a battery housing that is removably secured to a portion of an electrical device housing includes an ejection member secured to the battery housing. The electrical device housing includes a battery power operated tool, a battery charger, or other device to which the battery could be coupled. The ejection member is provided with a button and an arm, wherein the ejection member operates to transfer a mechanical force applied to the first button through the arm to the portion of the electrical device.

In another aspect of the present invention, at least one rechargeable cell is housed within a battery housing. At least one electrical contact is electrically connected to the at least one cell. A first ejection member having a first button and a first arm is rotatably secured to the battery housing. A second ejection member having a second button and a second arm is also rotatably secured to the battery housing. The first and second ejection members are adapted to transfer a force to a portion of an electrical device when a force is applied at the first and second button, respectively. A latch may also be provided with the battery housing to secure the battery to an electrical device. In one embodiment, the latch is adapted to disengage the battery pack from the electrical device when a force is applied to either the first or second button.

In yet another aspect of the present invention, the battery pack is engagable with a battery charger and the first and second ejection members transfer a force to a portion of the electrical device to assist in disengaging the battery pack from the electrical device.

In another aspect of the present invention, a battery ejection mechanism for ejecting a battery housing that is removably secured to a portion of an electrical device housing includes an ejection member secured to the battery housing. The battery housing includes a first latch movably attached thereto and a second latch movably attached thereto. The mechanism includes a first ejection member secured substantially within the battery housing and comprising a first button and a first arm, wherein the first ejection member operates to transfer a mechanical force applied to the first button through the first arm to both the power tool or battery charger housing and the first latch. The mechanism also includes a second ejection member secured substantially within the battery housing and comprising a second button and a second arm, wherein the second ejection member operates to transfer a mechanical force applied to the second button through the second arm to both the power tool or battery charger housing and the second latch. According to one embodiment in connection with this aspect of the present invention, both the first button and the second button must be moved to release the battery housing from the electrical device.

In another aspect of the present invention, a battery housing is adapted to house at least one rechargeable cell. At least one electrical contact is electrically connected to the at least one cell. A first latch and a second latch are movably attached to the battery housing. A first ejection member is rotatably secured substantially within the housing and includes a first button and a first arm wherein the first ejection member operates to transfer a mechanical force applied to the first button through the first arm to both a portion of power tool or battery charger housing and the first latch. A second ejection member is also rotatably secured substantially within the housing and includes a first button and a first arm wherein the first ejection member operates to transfer a mechanical force applied to the second button through the second arm to both a portion of power tool or battery charger housing and the second latch. According to one embodiment in connection with this aspect of the present invention, both the first button and the second button must be moved to release the battery housing from the electrical device.

In another aspect of the present invention, at least one rechargeable cell is housed within a battery housing. At least one electrical contact is electrically connected to the at least one cell. A first ejection member having a first button and a first arm is rotatably secured to the battery housing. A second ejection member having a second button and a second arm is also rotatably secured to the battery housing. The first and second ejection members are adapted to transfer a force to an electrical tool when a force is applied at the first and second button, respectively. First and second latches may also be provided with the battery housing to secure the battery to an electrical tool housing. In one embodiment, the first and second latches are adapted to disengage from the tool housing when a force is applied to the first and second buttons, respectively.

DETAILED DESCRIPTION

Figure 1:
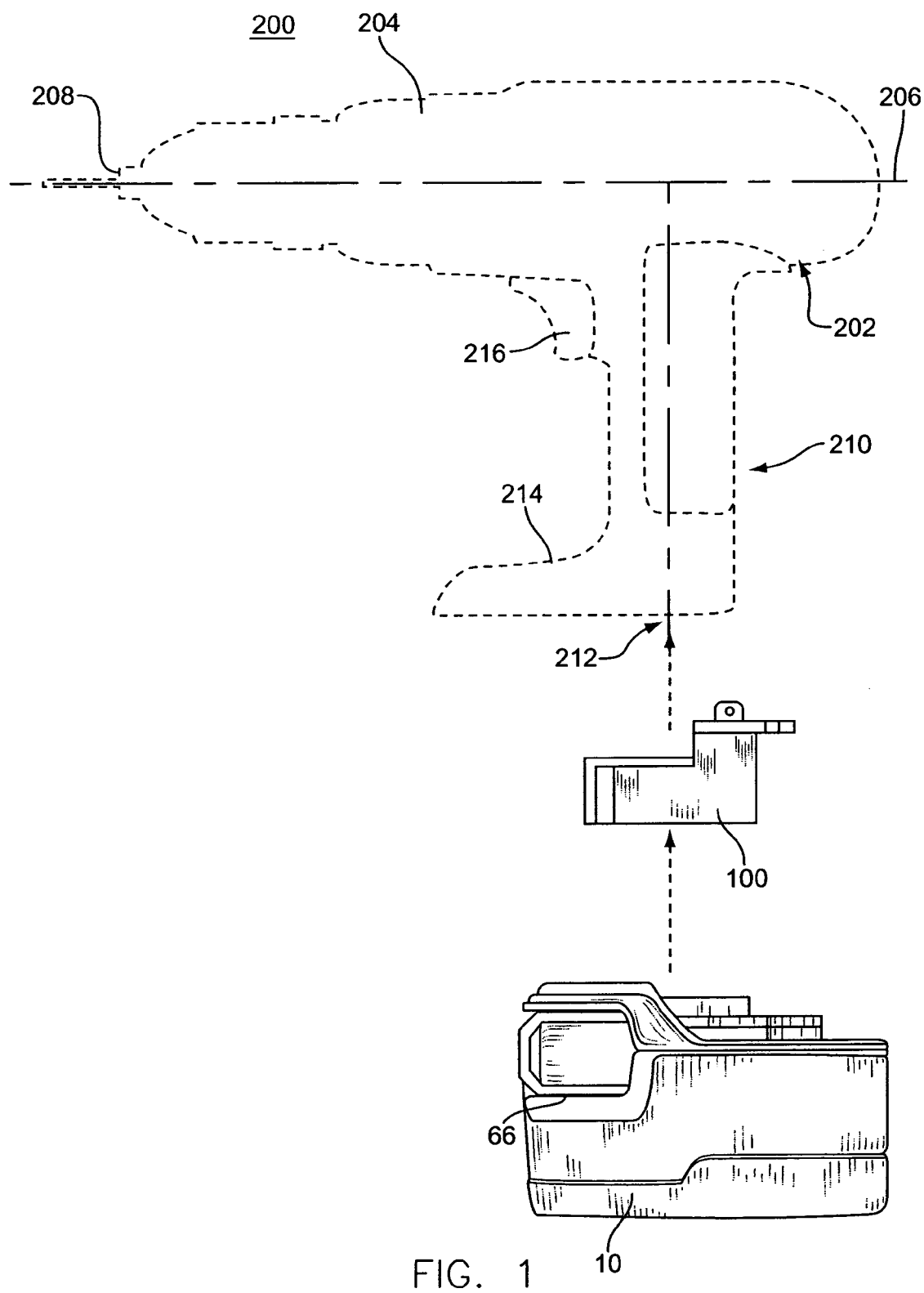
FIG. 1 is an exploded view of an electrical device in the form of a tool shown in phantom to indicate that the electrical device may be any type of electrical device that engages a battery pack.

Referring now to the drawings and initially to FIG. 1, one embodiment of an electrical device is shown as a battery operated power tool 200. The electrical device in the form of a tool 200 has a housing 202, preferably molded of a suitable plastic material. The housing 202 includes a main body or barrel portion 204, which is generally tubular and extends along a longitudinal axis 206. Disposed within the barrel portion 204 is a suitable electrical motor (not shown) having an output shaft 208 adapted for connection to associated tools (not shown), such as bits, in a known manner. The housing also includes a handle portion 210 that extends downwardly from the barrel portion 204 generally along a second axis 212. The handle portion 210 has a skirt end 214 provided with a peripheral end surface (not shown) that lies in a plane substantially perpendicular to the second axis 212. The handle portion 210 defines therein a cavity (not shown) that is open at the skirt end 214. The tool 200 is provided with a trigger mechanism 216 mounted on the housing substantially adjacent to the junction between the handle portion 210 and the barrel portion 204 and adapted to actuate the tool 200 in a known manner.

As will be discussed in more detail below in reference to FIGS. 3A–3B, a portion of an electrical device housing 100 preferably molded of a suitable plastic material is provided with a cavity near the peripheral end surface and is adapted to engage a battery housing 10. Although the portion of the electrical device housing 100 can be molded as part of the electrical device, it is possible that the portion of the electrical device housing 100 may be secured to the electrical device by any suitable fastener.

In one embodiment, the tool 200 is provided with two channel members (not shown) disposed along the inner wall of the cavity (not shown) near the peripheral end surface (not shown) and adapted for receiving rail members 24 and 26 disposed on the battery housing 10 for guiding and mounting the battery housing 10. It should be noted that the foregoing embodiment is exemplary, and other embodiments of the power tool are contemplated by the present invention. Other embodiments may include a power tool having a single barrel portion to house the motor while doubling as a handle. Additionally, the battery housing 10 may be disposed at any angle with respect to an axis of any barrel portions of the tool.

Figure 4A:
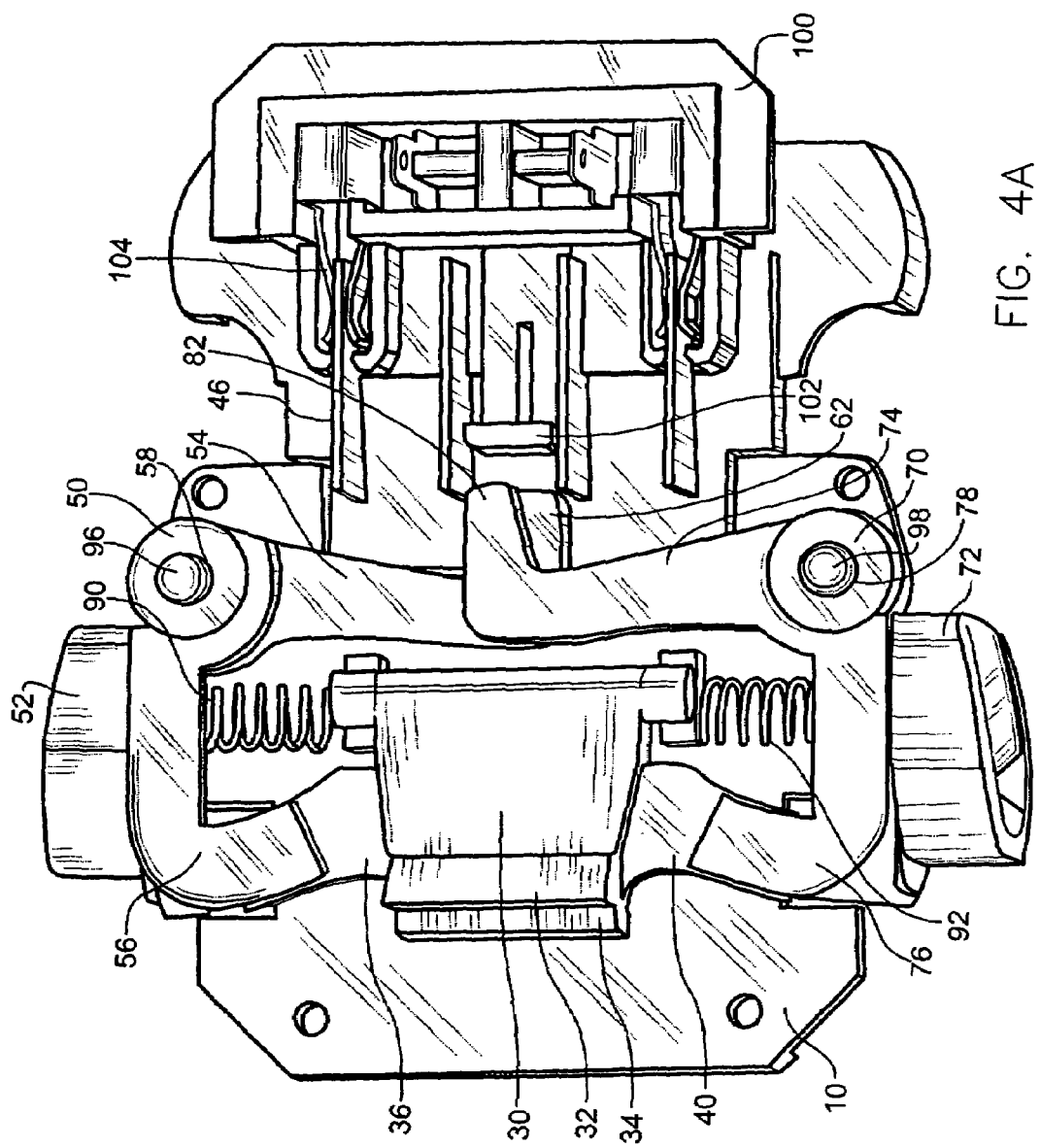
FIG. 4A is a top plan view of one embodiment of the battery ejection mechanism according to the present invention showing the ejection mechanism in an operable position such that the battery pack electrical contacts are electrically connected to electrical contacts provided in the electrical device.

Referring back to FIGS. 1–2, the battery housing 10 has a top 12, bottom 14, front 16, rear 18, first side 20, second side 22, first rail member 24, second rail member 26 and at least one cell 8 for providing electrical power. The battery housing 10 may be molded of a suitable plastic material or may be constructed from any material suitable for use with the above-described electrical device. The battery housing 10 may be provided with a latch 30 that extends through an aperture 28 in the top 12 to engage a portion of the electrical device housing 100 to removably secure the battery to the tool. A first button 52 is movably disposed along the first side 20 through an opening 66 formed between the top 12 and bottom 14. Referring also to FIG. 4A, a second button 72 is movably disposed along the second side 22 in a similar manner. As will be discussed in more detail below, the first button 52 and the second button 72 are attached to a first ejection member 50 and a second ejection member 70, respectively.

The first and second rail members 24 and 26 are substantially rigid elements that extend approximately perpendicular to the second axis 212 of the tool housing 202. In other words, the first and second rail members 24 and 26 extend parallel to the plane of the top 12 of the battery housing 10 and perpendicular to its front side 16. The first and second rail members 24 and 26 may be molded of a suitable plastic material. A second aperture 44 is provided near the front 16 of the battery housing 10 to expose a plurality of electrical contacts 46 electrically connected to the at least one cell 8. The second aperture 44 is also provided between the first and second rail members 24 and 26 such that the second aperture 44 has a substantially rectangular shape. The second aperture 44 opens in a direction orthogonal to the plane of the top 12 of the housing 10.

As described above, the tool housing 202 is provided with two channels (not shown) of complimentary form to the rails 24 and 26. Each channel is open at least at one end to allow the front end of the rails 24 and 26 to enter the channels as the battery housing 10 is slidably engaged with the portion of the electrical device housing 100 to an operable position. Desirably, the first rail member 24 and second rail member 26 are open near the front 16 of the battery housing 10. Each rail member 24 and 26 extends toward the rear 18 of the battery housing and terminate at a stop 25 and 27, respectively.

Figure 5A:
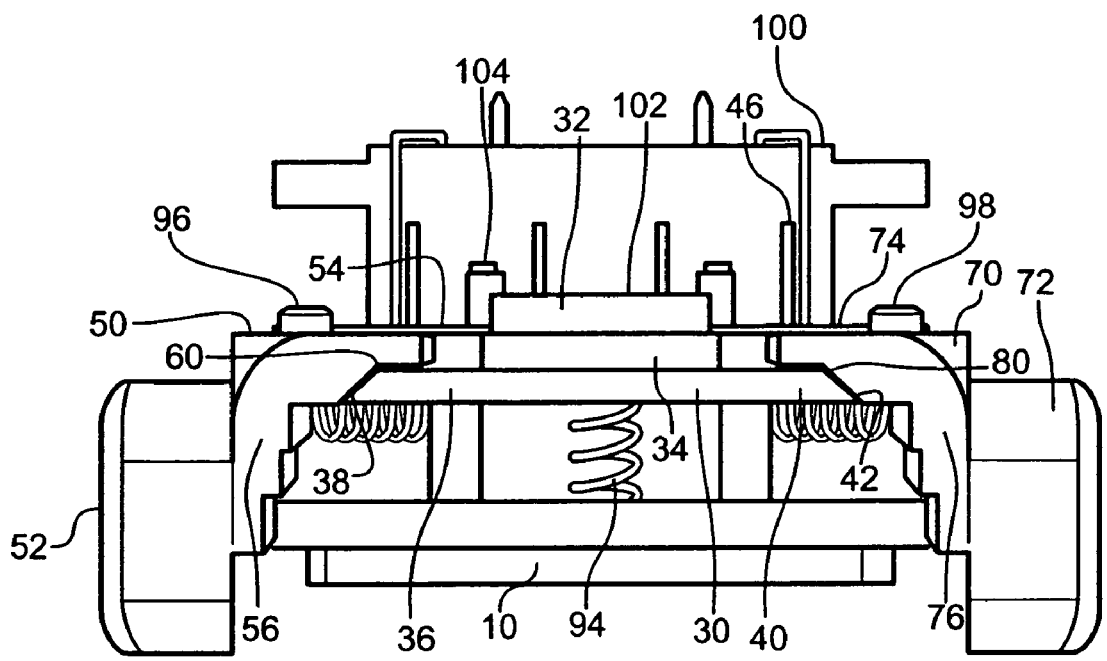
FIG. 5A is a rear view of the battery ejection mechanism of FIG. 4A showing the latch in the engaged position such that it will engage a complementary portion of the electrical device housing to removably secure the battery pack onto the tool.
Figure 5B:
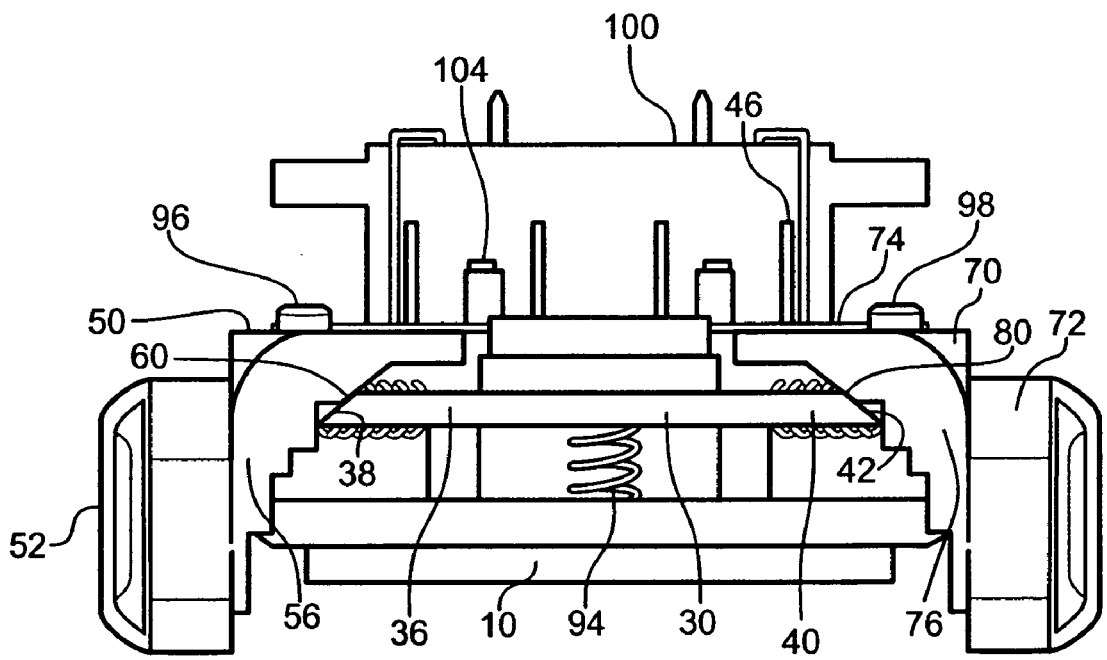
FIG. 5B is a rear view of the battery ejection mechanism of FIG. 4A showing the latch in a depressed position so that the battery pack can be removed from the electrical device housing.

Referring to FIGS. 4A and 5A, the term "operable position" corresponds to the condition wherein at least one of the battery electrical contacts 46 is electrically connected to at least one of device electrical contacts 104. Where a latch is provided, the term "operable position" also corresponds to a latch 30 position that is engaged with either the portion of the electrical device housing 100 or the tool housing 202 to removably secure the battery housing 10 to the tool 200. In this embodiment, the battery housing 10 is provided with a latch 30 that extends through an aperture 28 in the top 12 of the housing 10. As the battery housing 10 is slidably pushed along the rails 24 and 26, a second portion (not shown) of the electrical device housing 202 contacts the latch 30, forcing it downward and compressing a latch spring 94 disposed underneath the latch 30, as best seen in FIGS. 5A and 5B. When the rails 24 and 26 are fully inserted into the channels (not shown), the force provided by the compressed latch spring 94 forces the latch 30 to engage a recess (not shown) in a portion of the tool housing 202. At this point, the battery electrical contacts 46 and the device electrical contacts 104 are electrically connected. One skilled in the art should appreciate that alternate embodiments may include the first rail member 24, the second rail member 26, or both, disposed along the second portion (not shown) of the electrical device housing 202, wherein the corresponding first channel member or second channel member is disposed along the battery housing 10.

Figure 2:
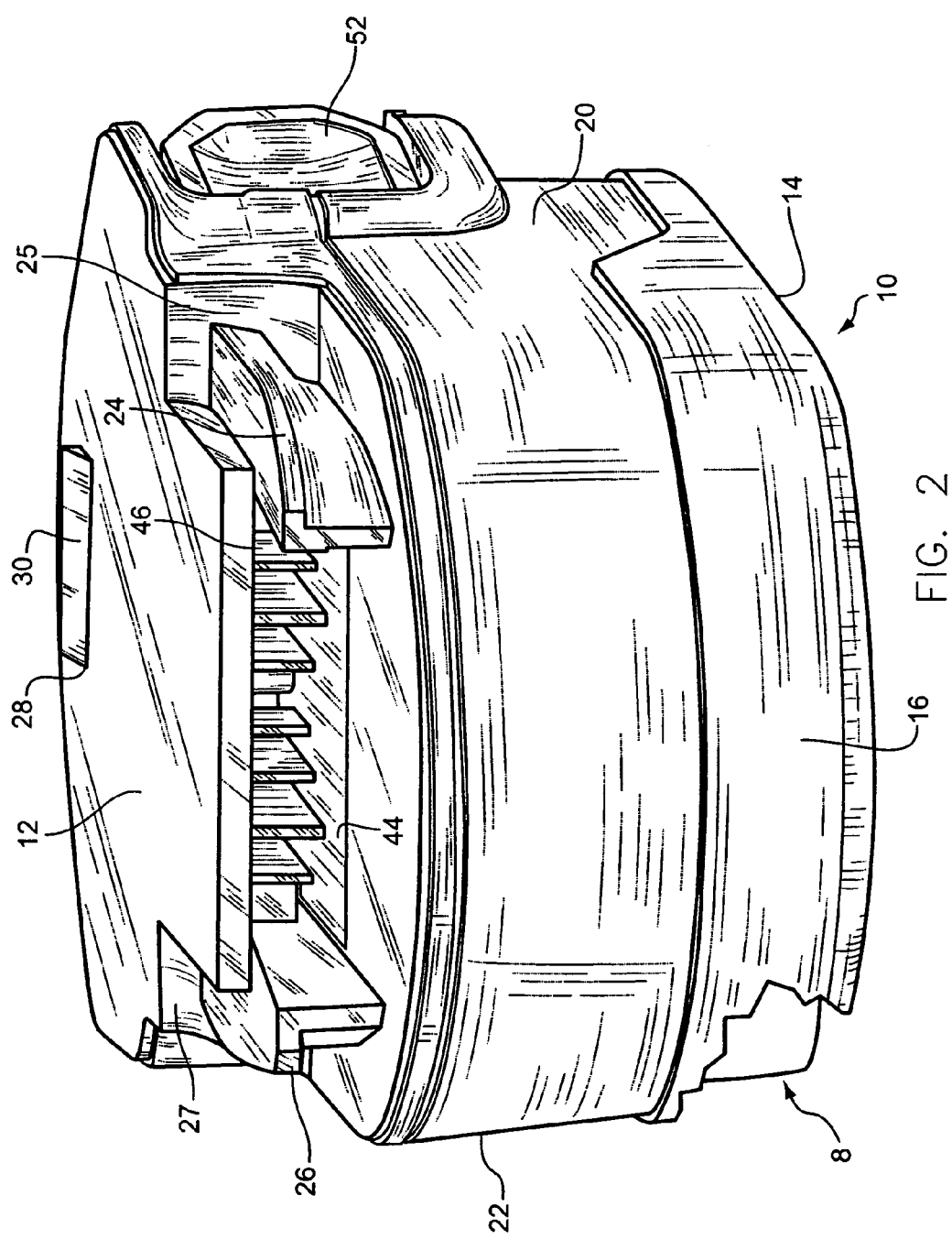
FIG. 2 is a perspective view of one embodiment of the battery housing according to the present invention.
Figure 3A:
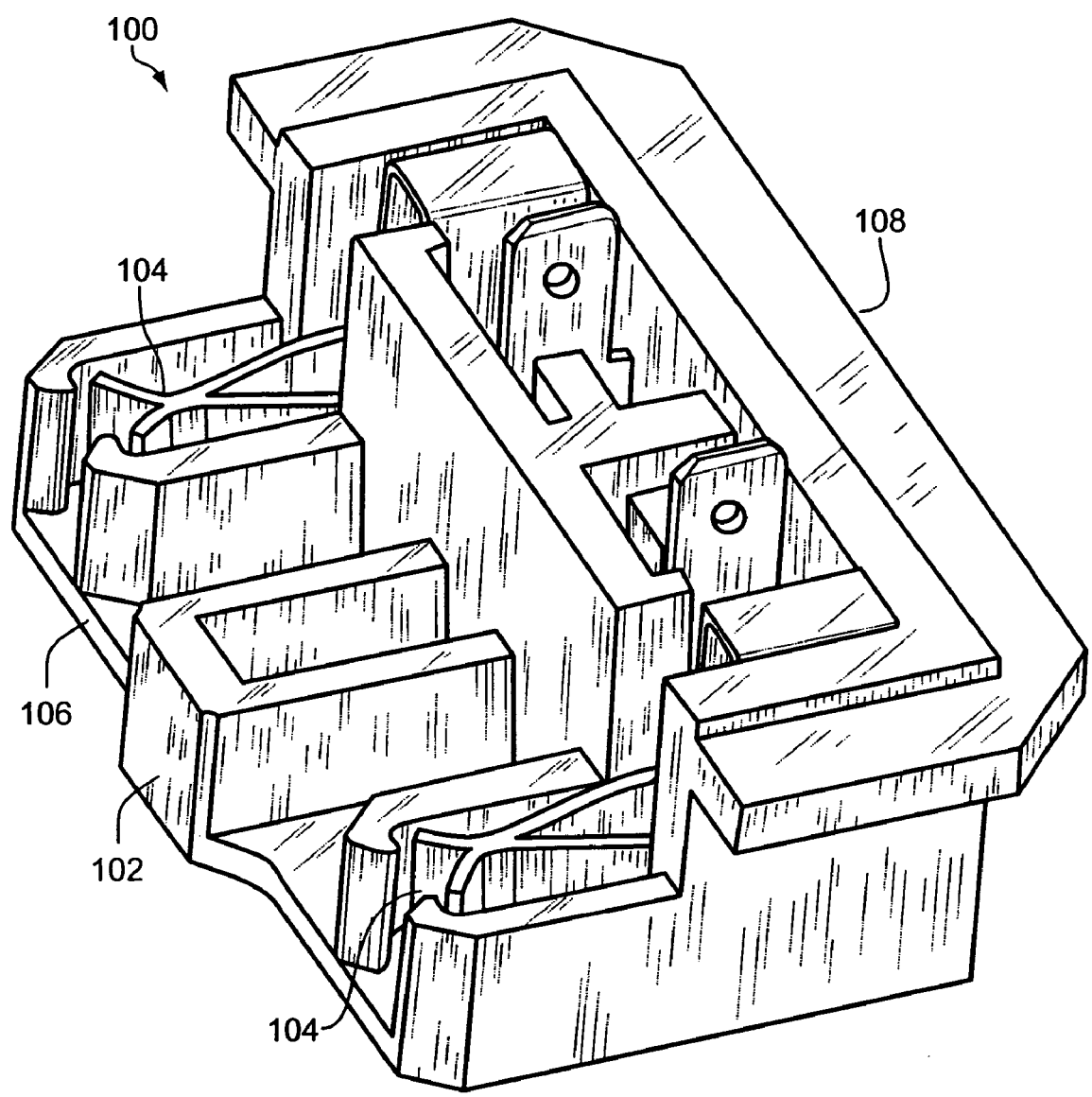
FIG. 3A is a perspective view of one embodiment of the portion of the electrical device having electrical contacts.
Figure 3B:
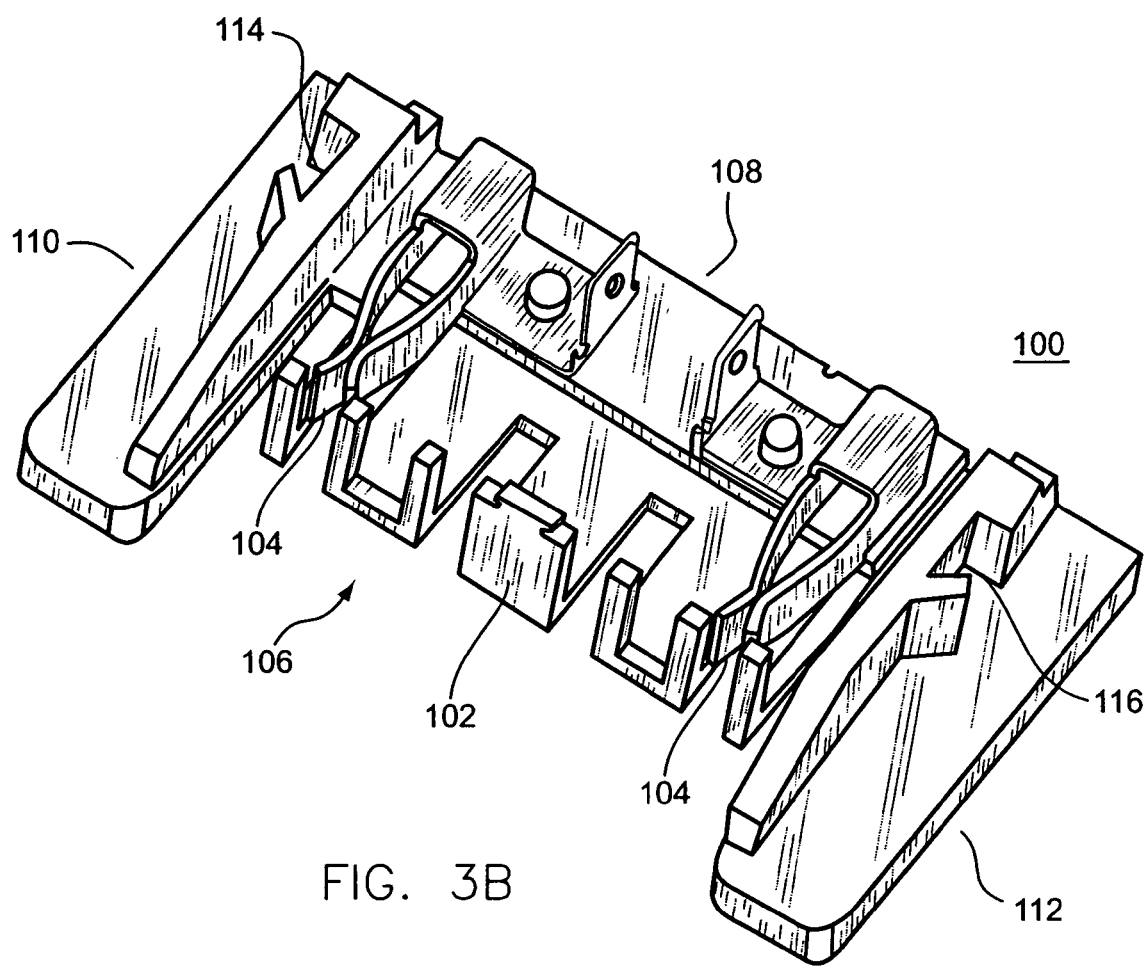
FIG. 3B is a perspective view of another embodiment of the portion of the electrical device having electrical contacts.

Turning now to FIGS. 3A–B, two embodiments of a portion of an electrical device housing 100 according to the present invention are shown. In FIG. 3A, the portion of the electrical device housing 100 has a front 106 and back 108. Referring also to FIGS. 1 and 2, the front 106 of the portion of an electrical device housing 100 is adapted to fit within the aperture 44 provided near the front 16 of the battery housing 10. A plurality of device electrical contacts 104 and an ejection arm contact area 102 are provided at substantially the front 106 of the portion of an electrical device housing 100. The plurality of device electrical contacts 104 and the battery electrical contacts 46 are adapted to establish an electrical connection between the battery housing 10 and the portion of an electrical device housing 100. In this embodiment, the plurality of device electrical contacts 104 are adapted to receive the battery electrical contacts 46. In other words, the device electrical contacts 104 are female, while the battery electrical contacts 46 are male. It should be apparent to one skilled in the art that any type of electrical contacts could be used to establish an electrical connection between the battery housing 10 and the electrical device housing 100. In this embodiment, the ejection arm contact area 102 is a substantially rigid planar element fixedly attached to the portion of the electrical device housing. The ejection arm contact area 102 will be discussed in more detail below.

Figure 6:
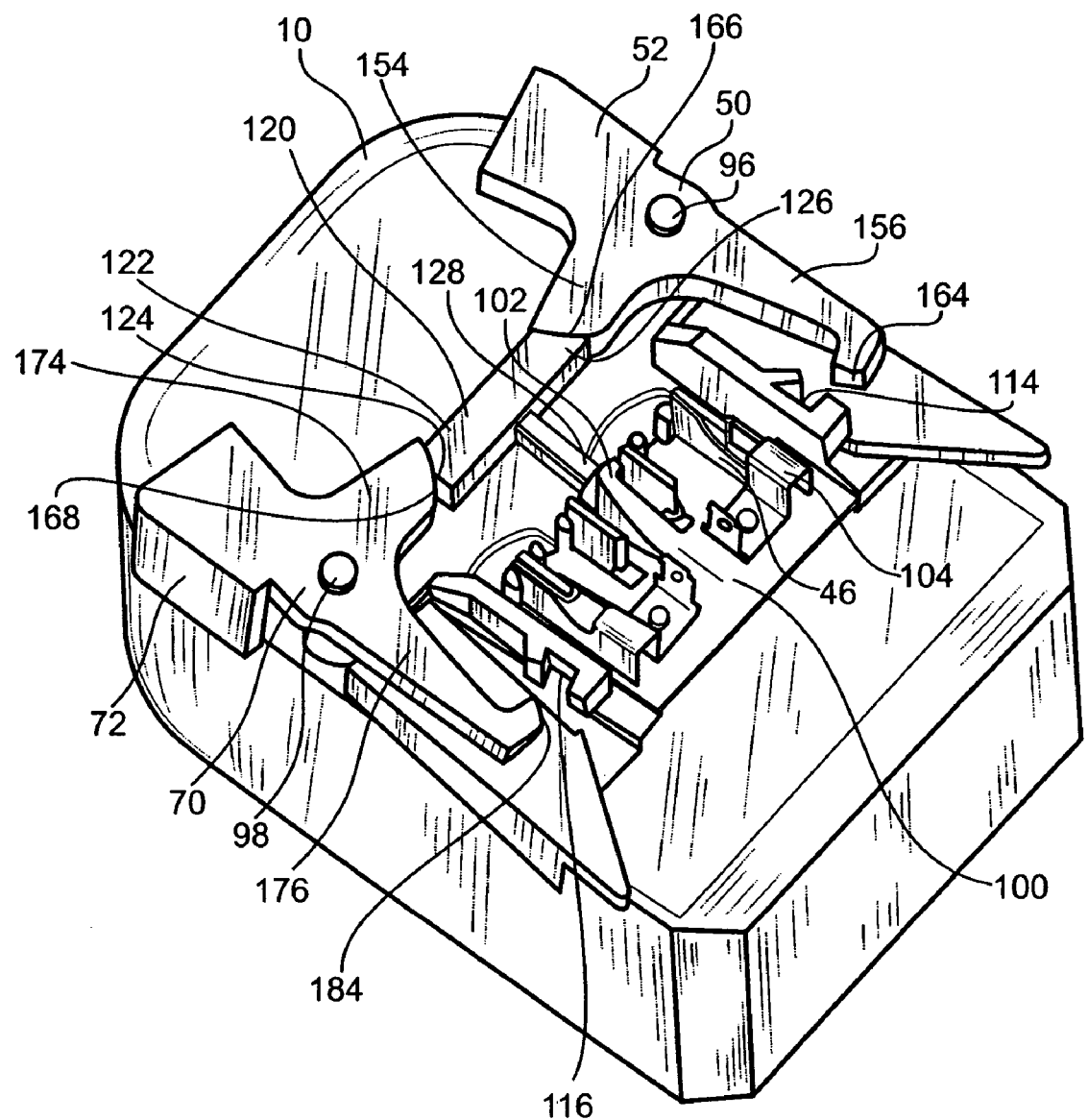
FIG. 6 is a top perspective view of another embodiment of the battery ejection mechanism according to the present invention.

Another embodiment of the portion of an electrical device housing 100 is shown in FIG. 3B. In this embodiment, the portion of the electrical device housing 100 has a front 106, back 108, first side 110 and a second side 112. Once again, a plurality of device electrical contacts 104 and an ejection arm contact area 102 are disposed at substantially the front 106 of the portion of the electrical device housing 100. In addition, a first recess 114 is disposed along the first side 110 of the portion of the electrical device housing 100 and a second recess 116 is disposed along the second side 112 of the portion of the electrical device housing 100. Referring also to FIG. 6 and as will be discussed in more detail below in reference to alternate embodiments of the present invention, the recesses 114 and 116 are adapted to receive a first latch 164 and a second latch 184 attached to or formed as part of the first 50 and second 70 ejection arms, respectively.

Figure 4B:
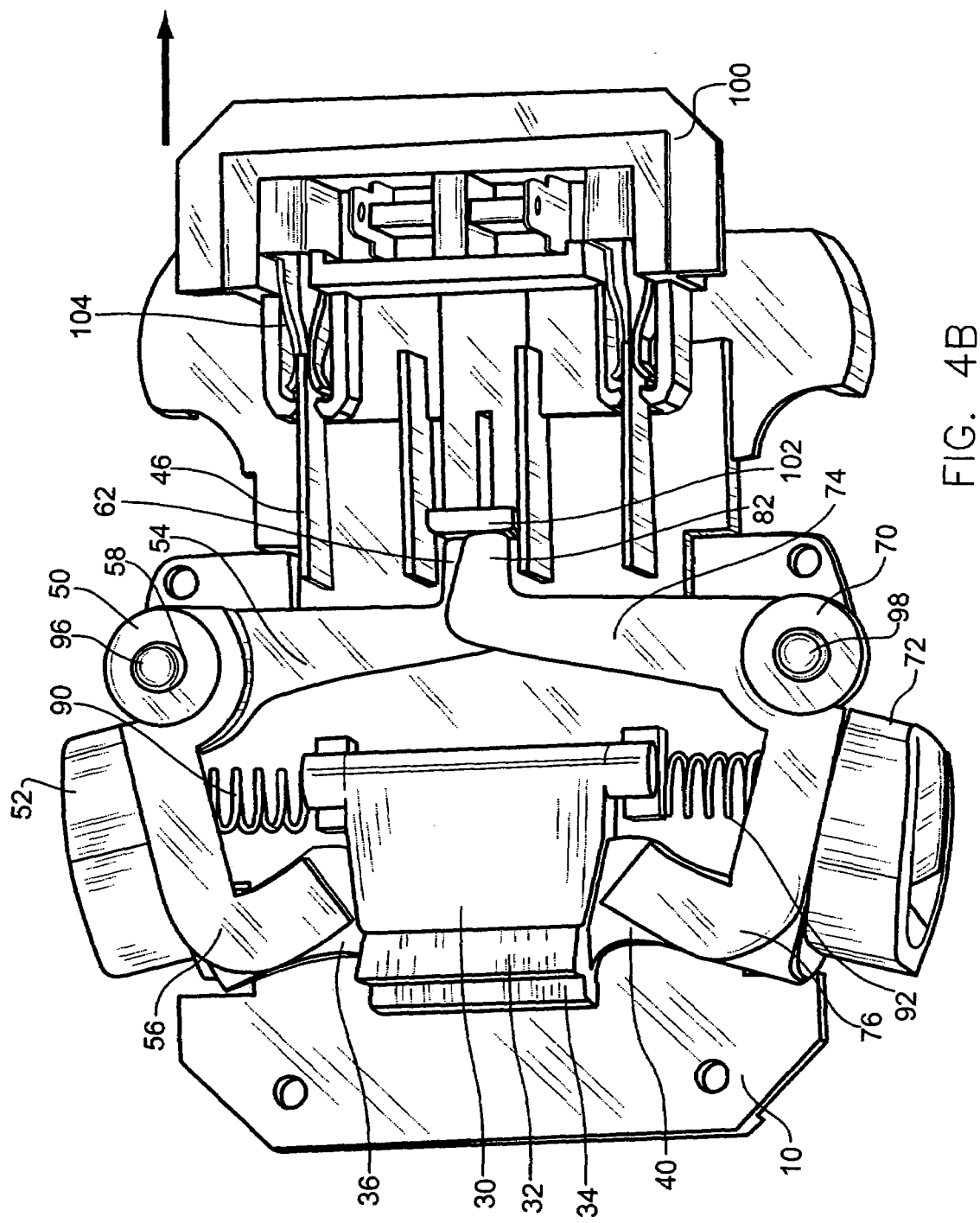
FIG. 4B is a top plan view of the battery ejection mechanism of FIG. 4A showing the ejection member in contact with a portion of the electrical tool to urge the battery pack electrical contacts out of engagement with electrical contacts provided in the electrical device.

One embodiment of a battery ejection mechanism in accordance with the present invention is shown in FIGS. 4A–B. The top 12 of the battery housing 10 has been removed to expose the mechanism in more detail. The battery housing 10 is provided with a first ejection member 50, a second ejection member 70, a latch 30, a first button spring 90, a second button spring 92, a latch spring 94, a first post 96, a second post 98, and a plurality of battery electrical contacts 46. The portion of an electrical device housing 100 has a plurality of device electrical contacts 104 and an ejection arm contact area 102.

The first ejection member 50 is a substantially rigid element preferably molded of a suitable plastic material and comprises a first button 52 and a first ejection arm 54. In one embodiment, the first ejection member 50 is provided with an aperture 58 adapted to rotatably secure the first ejection member 50 about a first post 96 in a known manner. The first button 52 is disposed along the first side 20 of the battery housing 10, and is biased outwardly by the first spring 90.

The first ejection arm 54 terminates in a first contact tip 62 for contacting the ejection arm contact area 102 of the portion of an electrical device housing 100. In alternate embodiments, the first ejection arm 54 comprises a cam. The first ejection member 50 is rotatably attached to the first post 96 at the aperture 58. The first post 96 is a substantially rigid shaft preferably molded of a suitable plastic material and fixedly attached to an inner surface of the battery housing 10. When a force is applied to the first button 52, the first ejection member 50 will pivot about the first post 96. As the first ejection member 50 pivots, the first ejection arm 54 contacts the ejection arm contact area 102 of the portion of the electrical device housing 100, as described below. In other words, when a force is applied to the first button 52 in an inward direction i.e., toward the center of the battery housing (normal to the plane of the first side 20), the spring 90 is compressed and the first ejection arm 54 rotates and the first contact tip 62 moves toward the front of the housing 16.

In another embodiment, the ejection member 50 also includes a first latch arm 56. The first latch arm 56 is connected to the first button 52 and extends inwardly from the first button 52 toward the latch 30. The first latch arm 56 terminates in a wedge 60 adapted to cooperate with a complimentary wedge 38 on the latch 30 to transform the inwardly applied force at the first button 52 to a downward force on the latch 30 as best seen in FIGS. 5A and 5B. The first ejection arm 54 is also connected to, the first button 52 and extends from the first side 20 toward the center of the battery housing 10 and is substantially perpendicular to the plane defined by the first side 20. Desirably, the first latch arm 56 and the first ejection arm 54 are integrally molded with the first button 52. Where the first ejection member 50 includes a first latch arm 56, as the first ejection member 50 pivots, the first latch arm 56 contacts the latch 30. In other words, as the first button 52 is depressed or moved inward against the biasing effect of the spring 90, the first latch arm 56 moves toward the center of the housing 10.

Similarly, the second ejection member 70 is a substantially rigid element preferably molded of a suitable plastic material and comprises a second button 72 and a second ejection arm 74. In one embodiment, the second ejection member 70 is provided with an aperture 78 adapted to rotatably secure the second ejection member 70 about a second post 98 in a known manner. The second button 72 is disposed along the second side 22 of the battery housing 10, and is biased outwardly by the second spring 92.

The second ejection arm 74 terminates in a second contact tip 82 for contacting the ejection arm contact area 102 of the portion of an electrical device housing 100. The second ejection member 70 is rotatably attached to a second post 98 at the aperture 78. The second post 98 is the substantially rigid shaft preferably molded of a suitable plastic material and fixedly attached to an inner surface of the battery housing 10. When a force is applied to the second button 72, the second ejection member 70 will pivot about the second post 98. As the second ejection member 70 pivots, the second ejection arm 74 contacts the ejection arm contact area 102 of the portion of the electrical device housing 100, as described below. In other words, when a force is applied to the second button 72 in an inward direction, i.e. toward the center of the battery housing (normal to the plane of the second side 22) the spring 92 is compressed and the second ejection arm 74 rotates and the second contact tip 82 moves toward the front of the housing 16.

In another embodiment, the second ejection member 70 also includes a second latch arm 76. The second latch arm 76 is connected to the second button 72 and extends inwardly from the second button 72 toward the latch 30. The second latch arm 76 terminates in a wedge 80 adapted to cooperate with a complimentary wedge 42 on the latch 30 to transform the inwardly applied force at the first button 52 to a downward force on the latch 30 as best seen in FIGS. 5A and 5B. The first ejection arm 74 is also connected to the second button 72 and extends from the second side 22 toward the center of the battery housing 10 and is substantially perpendicular to the plane defined by the second side 22. Desirably, the second latch arm 76 and the second ejection arm 74 are integrally molded with the second button 72. Where the second ejection member 70 includes a second latch arm 76, as the second ejection member 70 pivots, the second latch arm 76 contacts the latch 30. In other words, as the second button 72 is depressed or moved inward against the biasing effect of the spring 90, the second latch arm 76 moves toward the center of the housing 10.

In one embodiment, a latch 30 is movably attached to the battery housing 10. The latch 30 is substantially rigid and preferably molded of a suitable plastic material. The latch 30 comprises an engaging member 32, a ledge 34, a first compress arm 36 and a second compress arm 40. The engaging member 32 is adapted to fit within an aperture 28 in the top 12 of the battery housing 10 and engage a recess (not shown) provided in the tool housing 202. In one embodiment, the engaging member 32 comprises a wedge adapted to compress the latch spring 94 as the battery housing 10 is being secured to the tool housing 202, as described above. The latch spring 94 is positioned underneath the latch 30 and biases the latch 30 upward so that the engaging member 32 extends through an aperture 28 in the top 12 of the battery housing 10. The ledge 34 is adapted to stop the latch 30 from extending too far.

Referring also to FIGS. 5A–B, the first compress arm 36 extends laterally from the latch 30 toward the first latch arm 56 of the first ejection member 50. Similarly, the second compress arm 40 extends laterally from the latch 30 toward the second latch arm 76 of the second ejection member 70. In one embodiment, the compress arms 36 and 40 terminate in wedges 38 and 42 substantially complimentary to the wedges 60 and 80 of the corresponding ejection arms 50 and 70, described above.

FIG. 4A shows the battery housing 10 and the portion of an electrical device housing 100 connected in the operable position. In one embodiment, the first button spring 90 biases the first ejection member 50 in a first position wherein the first contact tip 62 of first ejection arm 54 does not contact the ejection arm contact area 102. Similarly, the second button spring 92 biases the second ejection member 70 in the operable position wherein the second contact tip 82 of the second ejection arm 74 does not contact the ejection arm contact area 102. In this position, the latch spring 94 biases the latch 30 upward so that the latch 30 engages a recess (not shown) in the electrical device housing 202, as described above.

Turning to FIG. 4B, the mechanism is shown after a suitable amount of force has been applied to the first 52 and second 72 buttons, to compress the first 90 and second 92 button springs, respectively. The force applied to the first ejection member 50 at the first button 52 causes the first ejection member 50 to rotate about the first post 96. As the first ejection member 50 rotates, the first contact tip 62 of the first ejection arm 54 contacts the ejection arm contact area 102 of the portion of an electrical device housing 100. As stated above, the ejection arm contact area 102 is fixedly attached to the portion of an electrical device housing 100. Thus, the force applied to the first button 52 is transferred to the portion of the electrical device housing 100 through the ejection arm 54. The transferred force causes the portion of an electrical device housing 100 and the battery housing 10 to alter positions relative to one another. Once a threshold level of force is applied to the first button 52, the battery electrical contacts 46 will begin to disengage from the device electrical contacts 104. The second ejection member 70 operates in a similar manner when a force is applied to the second ejection member 70 at the second button 72.

FIGS. 5A–5B show the latch 30, the first latch arm 56, and the second latch arm 76 in operation. As stated above, the first 50 and second 70 ejection members have first 56 and second 76 latch arms terminating in wedges 60 and 80 substantially complimentary to the wedges 38 and 42 formed by the compress arms 36 and 40. When connected to the electrical device housing 202, the latch 30 will engage a recess (not shown) in the electrical device housing 202, securing the battery housing 10 to the electrical device housing 202. In order to disengage the latch 30 from the recess (not shown), an operator applies a force to the either the first 52 or second 72 button, and preferably to both. As described above, the first ejection member 50 will pivot about the first post 96 when a force is applied to the first button 52. The wedge 60 of the first latch arm 56 contacts wedge 38 of the first compress arm 36 compressing the latch spring 94 and forcing the latch 30 down. In a similar fashion, when a force is applied to the second button 72, the second ejection member 70 will pivot about the second post 98 compressing the latch spring 94 and forcing the latch 30 down. Once a threshold level of force has been applied to either the first ejection member 50 or the second ejection member 70, the latch 30 will disengage from the recess (not shown) of the electrical device housing 202. Preferably, the contact tips 62 and 82 of the ejection arms 54 and 74 will not contact the contact area 102 of the portion of an electrical device housing 100 until the latch 30 has disengaged from the recess (not shown).

It should be apparent to one skilled in the art that alternate methods could be used to transfer the force applied to the first button 52 and second button 72 to the latch 30 in order to disengage the latch 30 from a recess (not shown) in the electrical device housing 202. For example, one skilled in the art should realize that the latch 30 discussed above could be attached to the electrical device housing 202, and the recess (not shown) on the battery housing 10. Furthermore, the ejection mechanism described above could alternately be placed in the electrical device housing 202 instead of the battery housing 10, wherein the ejection arm contact area 102 would be fixedly attached to the battery housing 10.

Turning now to FIG. 6, an alternate embodiment of an ejection mechanism according to the present invention is shown. The battery housing top 12 has been removed, showing the battery housing 10 and the portion of an electrical device housing 100. In other words, the mechanism is shown after a force has been applied to the buttons 52 and 72 sufficient to disengage the latch arms 156 and 176 provided on the ejection members 50 and 70 from the recesses 114 and 116 provided on the portion of the electrical device housing 100. In this embodiment, the battery housing is provided with first 50 and second ejection 70 members, first 96 and second posts 98, and a pushing member 120. The pushing member 120 is a substantially rigid member preferably molded of a suitable plastic material movably secured to the battery housing 10 and comprises a force receiving member 122 and a contact tip 128. In one embodiment, the receiving member 122 has a first surface 124 and a second surface 126 and is fixedly attached substantially perpendicular to the contact tip 128. The portion of an electrical device housing 100 is similar to the one shown in FIG. 3B.

The first latch arm 156 of the first ejection member 50 terminates in a first latch tip 164 adapted to engage the first recess 114 of the first side 110 of the portion of an electrical device housing 100. Similarly, the second latch arm 176 of the second ejection member 70 terminates in a second latch tip 184 adapted to engage the second recess 116 of the second side 112 of the portion of an electrical device housing 100. The rotation of the first 50 and second 70 ejection members about the first 96 and second 98 posts, respectively, causes the first 164 and second 184 latch tips to disengage from the first 114 and second 116 recesses, respectively.

In this embodiment, the first 154 and second 174 ejection arms terminate in surfaces 166 and 168 adapted to contact the surfaces 124 and 126 of the receiving member 122. As the ejection members 50 and 70 rotate about the posts 96 and 98, the ejection arms 154 and 174 contact the movably secured pushing member 120 at the curved surfaces 124 and 126 of the receiving member 122, forcing the pushing member 120 toward the portion of an electrical device housing 100. Thus, a force applied to the ejection members 50 and 70 is transferred to the electrical device housing 202, altering the relative positions of the device 202 and battery 10 housings. In one embodiment, the contact tip 128 will engage the ejection arm contact area 102 of the electrical contact plate 100 after the latch tips 164 and 184 have disengaged from the recesses 114 and 116, as described above. Once a threshold force has been applied to the ejection members 50 and 70, the battery electrical contacts 46 will begin to disengage from the device electrical contacts 104.

Figure 7A:
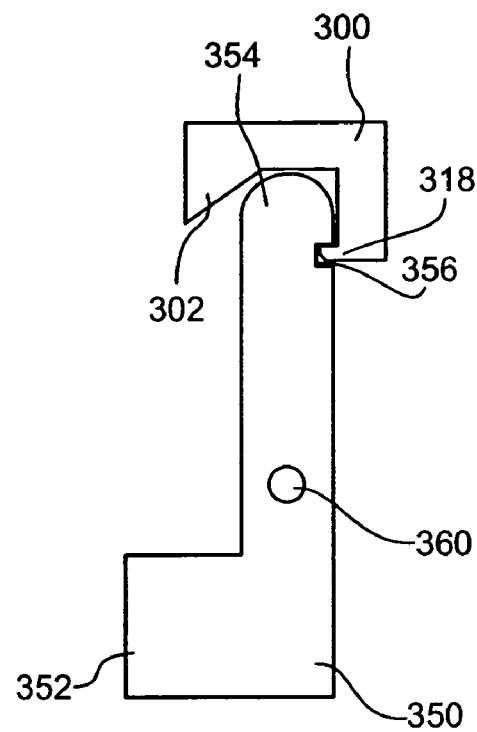
FIG. 7A is a top plan view of one embodiment of an ejection member and a portion of an electrical device housing according to the present invention.
Figure 7B:
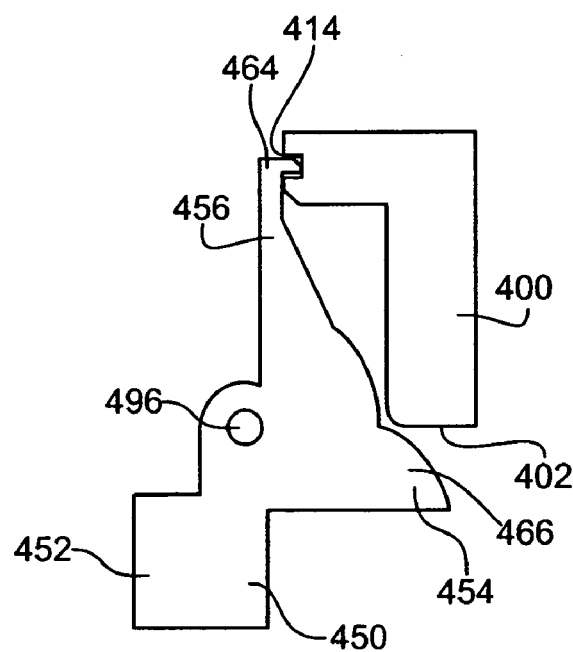
FIG. 7B is a top plan view of another embodiment of an ejection member and portion of an electrical device housing according to the present invention.

FIGS. 7A–7B show additional embodiments of the ejection members 50 and 70 and a cooperating section of the portion of an electrical device housing 100 according to the present invention. In FIG. 7A, the ejection member 350 comprises a button 352 and an ejection arm 354. The ejection arm 354 ends in a semicircle at a distal location from the button 350 and has a recess 356 provided near the end. The cooperating section of the portion of an electrical device housing 300 has a latch 318 and contact area 302. As the battery housing 10 is connected to the tool housing 202, the latch 318 contacts the semicircular end of the ejection arm 354 and engages the recess 356, securing the battery housing 10 to the tool housing 202. When a force is applied to the ejection member 350, it rotates about the post 360 and disengages the recess 356 from the latch 318. Once disengaged, the semicircular end of the ejection arm 354 contacts the contact area 302 of the portion of an electrical device housing 300, separating the battery 10 from the device housing 202, as described, above.

In FIG. 7B, the ejection member 450 comprises a button 452, a latch arm 456, and an ejection arm 454, similar to those described in FIG. 6. In this embodiment, the latch arm 456 terminates in a latch tip 464 and the ejection arm 454 terminates in a curved surface 466. The portion of an electrical device housing 400 comprises a contact area 402 and a recess 414. The recess 414 is adapted to engage the latch tip 464 when the battery housing 10 and tool housing 202 are connected in the operable position. As described above, the latch tip 464 will disengage from the recess 414 and the curved surface 466 of the ejection arm 454 will contact the contact area 402 of the device housing 400 when a force is applied to the button 452.

Figure 8:
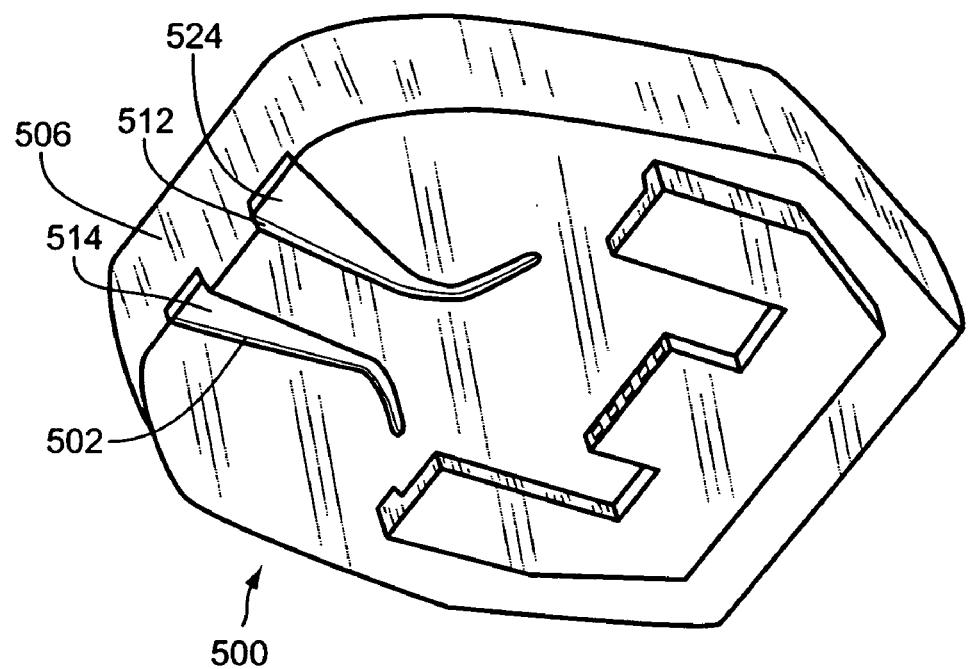
FIG. 8 is a perspective view of another embodiment of a portion of an electrical device housing and a battery housing having an ejection mechanism according to the present invention.
Figure 8:
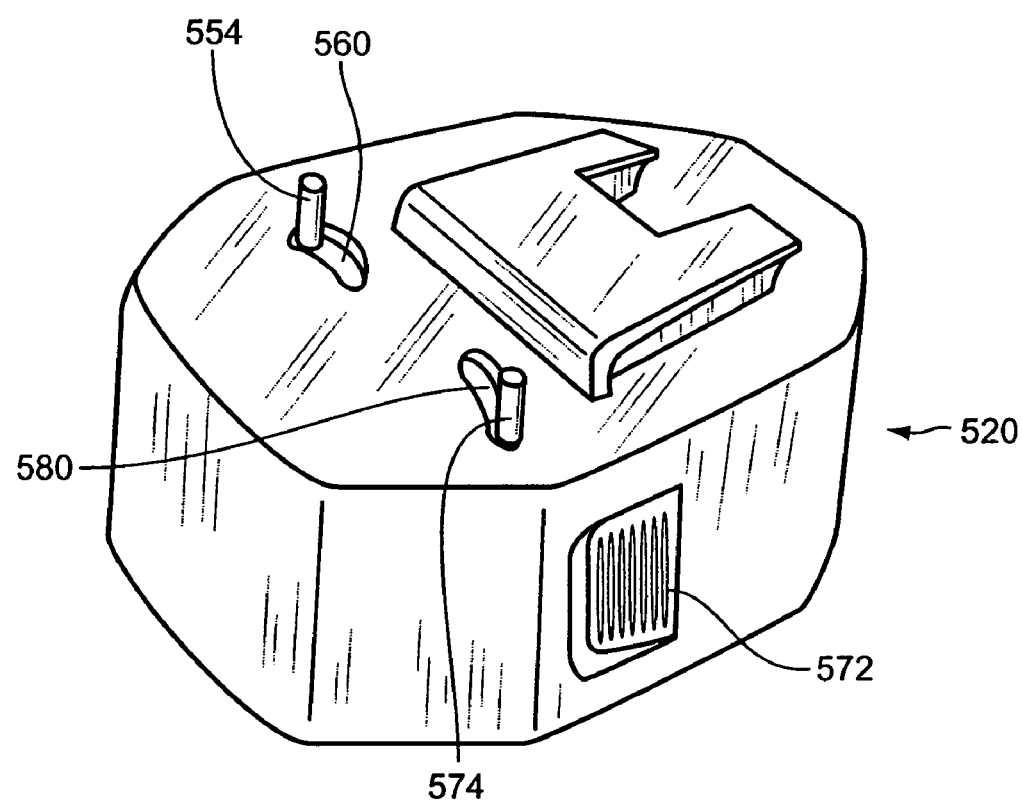

In FIG. 8, the battery housing 520 and a portion of the electrical device housing 500 are shown. The battery housing is provided with a first ejection member having a first button (not shown) and a first arm 554 and a second ejection member having a second button 572 and a second arm 574. As described above, the ejection members are biased outwardly by springs (not shown) to rest in a first position. The arms 554 and 574 are adapted to extend upward through the battery housing top at apertures 560 and 580. As a force is applied to the either the first or second 572 button, the respective arm 554 or 574 moves inward.

The portion of the electrical device housing 500 is provided with a first track 514 and a second track 524. The first and second tracks 514 and 524 are provided as depressions in the portion of the electrical device housing 500 adapted to receive the arms 554 and 574. The tracks 514 and 524 are adapted to receive the arms 554 and 574 at the front 506 of the portion 500 as the battery housing 520 is secured to the portion of the electrical device 500. Each track 514 and 524 defines a curved path that narrows as the track runs from the front 506 of the portion 500 toward the middle. Each track 514 and 524 also defines a wall that acts as an ejection arm contact area 502 and 512. Once the battery 520 has been secured to the portion 500, the tracks 514 and 524 are adapted to allow the ejection members to rest in the first position.

To remove the battery 520 after it has been secured to the portion of the electrical device housing 500, an operator applies a force to either the first button or second button 572, and preferably to both. As the force is applied to the buttons 572, the corresponding arm 554 and 574 will move inwardly. The arms 554 and 574 contact the ejection arm contact areas 502 and 512. The angle of the tracks 514 and 524 and the movement of the arms 554 and 574 acts to eject the battery 520 from the portion of the electrical device housing 500.

Figure 9:
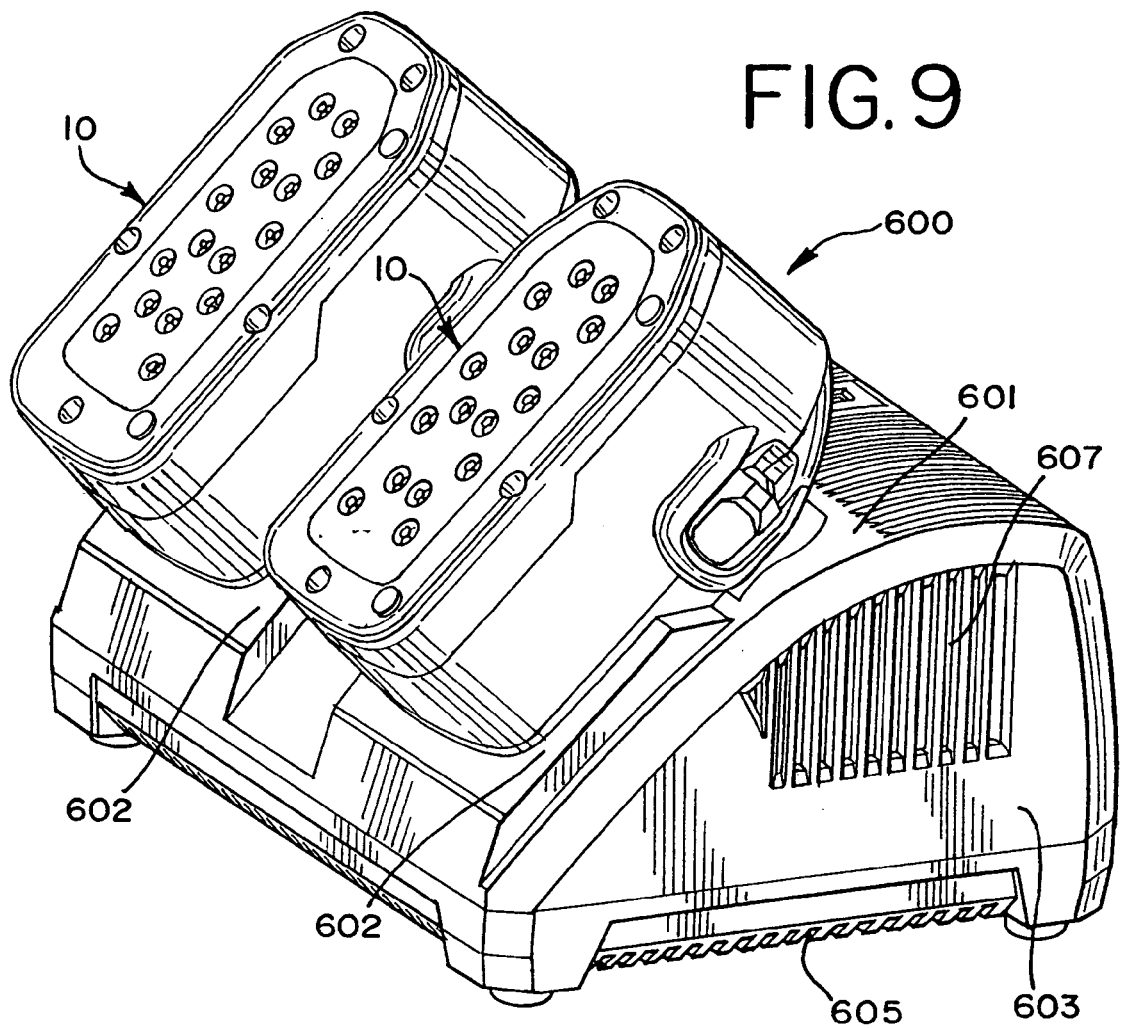
FIG. 9 is a perspective view of an electrical device housing with a pair of battery packs installed on the electrical device.

Turning now to FIG. 9 another embodiment of the present invention is shown. In this embodiment, the electrical device in the form of a battery charger 600 is shown. In this embodiment, the electrical device is capable of receiving a plurality of battery housings 10 to simultaneously charge a plurality of battery packs. Although the charger is capable of charging a plurality of battery packs, the charger is merely illustrative because one skilled in the art will understand that the electrical device could be in the form of a battery charger that is capable of charging only a single battery pack. Alternatively, the battery charger could be capable of charging more than a single battery pack.

Figure 10:
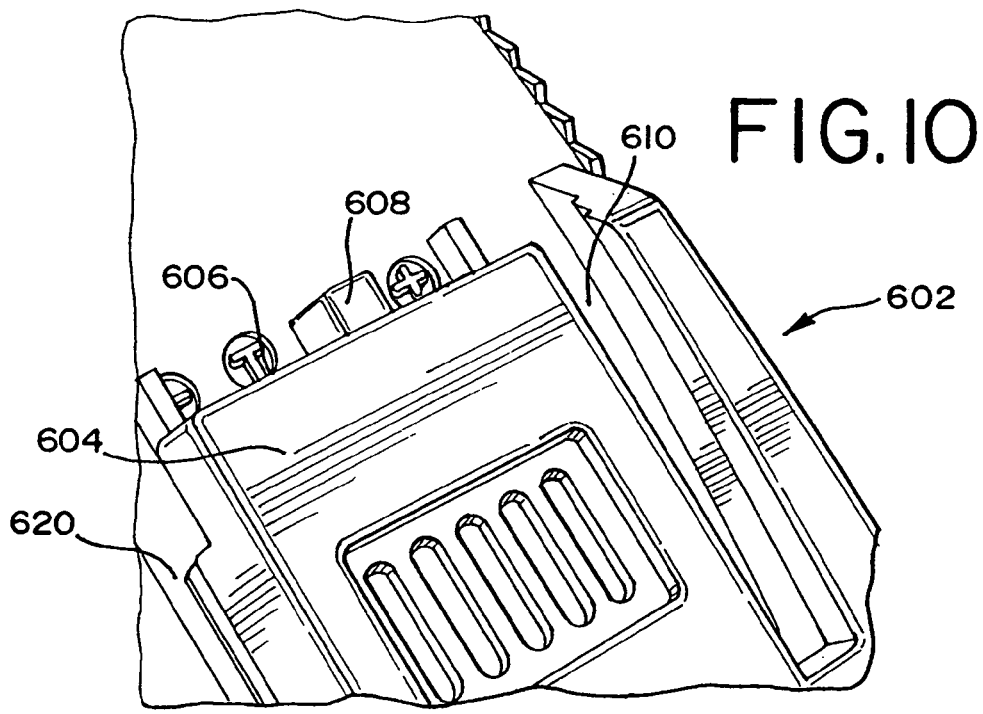
FIG. 10 is a perspective view of a portion of an electrical device housing that shows an ejection arm contact area that is contacted with the ejection mechanism sown for example in FIGS. 4A and 4B.

It is contemplated that the battery housings 10 described above will be useful with the battery charger shown in FIG. 9 and therefore, further detail of the battery housing 10 is not considered to be necessary except in connection with the specific embodiment of the battery charger 600 shown in FIGS. 9 and 10. Briefly, the charger 600 has a top 601 with a plurality of slots 602 provided on at least a portion of the top. The charger 600 also has a pair of sides 603 and a bottom 605. The sides may include vents 607.

Turning to FIG. 10, a portion of the battery charger 600 is shown in greater detail. The battery charger 600 is provided an open slot 602 to receive a battery housing 10, described above. The slot 602 is provided with a housing 604 that contains electrical contacts (not shown) that are electrically connected to the charging circuitry provided as part of a battery charger and that are conventional with known battery chargers. The housing contains a face 606 having at least an open portion through which the electrical contacts of the battery charger can be accessed.

The face 606 of the slot 602 is provided with an ejection arm contact area 608. The ejection arm contact area 608 may take any shape and may be located at a suitable position on the face 606 of the housing 604 so long as the first contact tip 62 and the second contact tip 82 can contact the ejection arm contact area 608. It will therefore be understood that the ejection arm contact area 608 serves the same function as the ejection arm contact area 102, described above. In the embodiment shown in FIG. 10, the ejection arm contact arm 608 is shown as being disposed in about the middle of the housing 604.

Each slot 602 has a first channel 610 and a second channel 620 of complimentary form to the rails 24 and 26. The first channel 610 is formed adjacent the housing 604 and is disposed between the housing 604 and an edge of the slot. The first channel 610 is formed adjacent the housing 604 and is disposed between the housing 604 and an opposite edge of the slot. Each channel 610, 620 is open at least at one end to allow the front end of the rails 24 and 26 to enter the channels as the battery housing 10 is slidably engaged with the portion of the electrical device housing to an operable position.

When the battery housing 10 is in the operable position, the electrical contacts 46 engage the electrical contacts of the charger (not shown) so that the battery cells within the battery housing 10 may be charged, as is conventional. Accordingly, when the battery cells are suitably charged and it is desired to remove the battery housing 10 from the charger, a force is applied to the first button 52 and the second button 72 to cause the first contact tip 62 and the second contact tip 82 to move toward the front 16 of the housing and to contact the ejection arm contact area 608. As a result, the battery housing 10 is moved in a direction away from the face 606 of the slot housing 604 and the battery housing 10 is assisted in being disengaged from the charger.

Figure 11A:
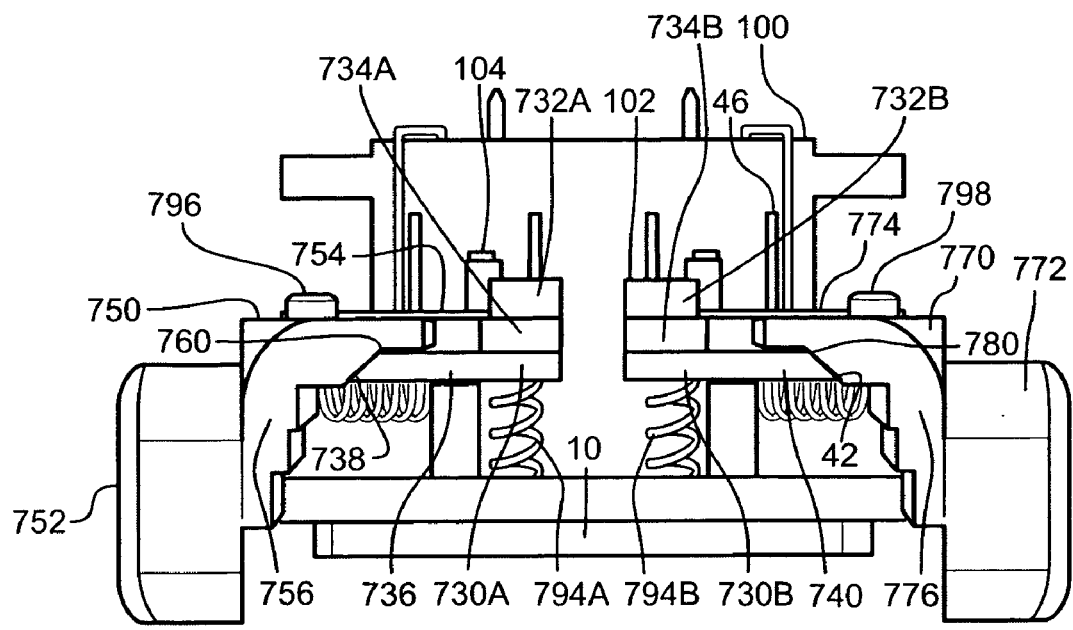
FIG. 11A is a rear view of one embodiment of the battery ejection mechanism showing the latch in the engaged position such that it will engage a complementary portion of the tool housing to removably secure the battery pack onto the tool.
Figure 11B:
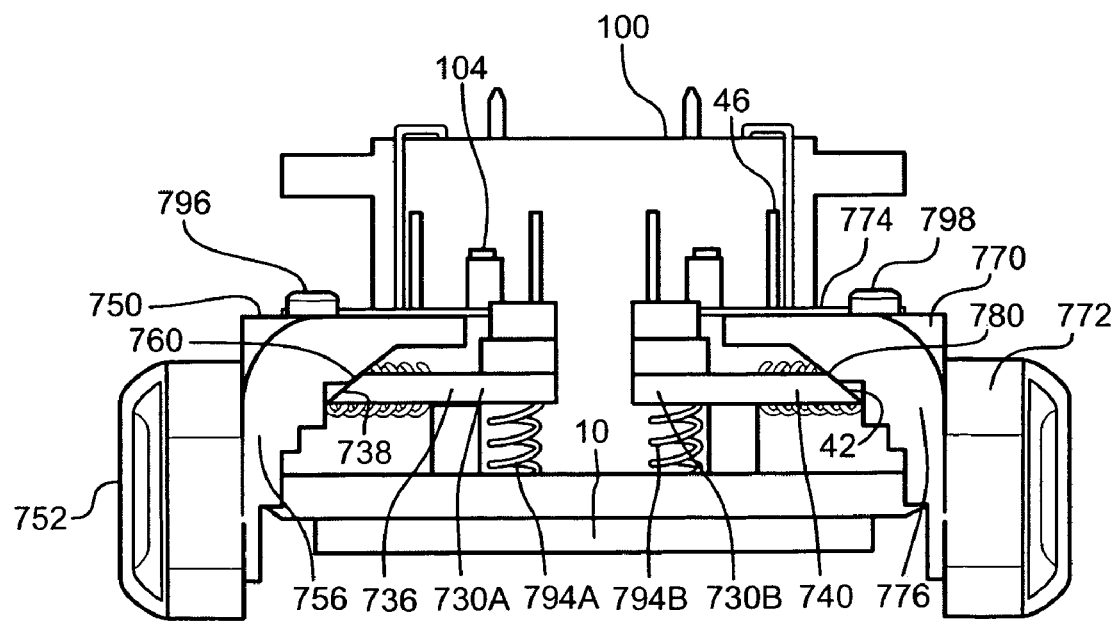
FIG. 11B is a rear view of the battery ejection mechanism of FIG. 11A showing the latch in a disengaged position so that the battery pack can be removed from the tool housing.

An alternate embodiment similar to those described above in FIGS. 4A, 4B, 5A, and 5B, but including multiple latches 730A and 730B is shown in FIGS. 11A and B. In the embodiment shown in FIGS. 11A and B, each latch 730A and 730B is associated with an ejection member 750 and 770 so that the battery housing 710 may not be removed unless the operator depresses each button 752 and 772. As noted above, the first 750 and second 770 ejection members have a first 756 latch arm and a second 776 latch arm terminating in a wedge 760 and 780, respectively, substantially complimentary to the wedges 738 and 742 formed by the compress arms 736 and 740. When connected to the electrical device housing 202, each latch 730A and 730B may engage a recess (not shown) in the electrical device housing 202, securing the battery housing 10 to the electrical device housing 202. Alternatively, each latch 730A and 730B may engage an associated recess (not shown). In order to disengage the latches 730A and 730B from the recess (not shown), an operator applies a force to the both the first 752 and the second 772 buttons. As described above, the first ejection member 750 will pivot about the first post 796 when a force is applied to the first button 752. The wedge 760 of the first latch arm 756 contacts the wedge 738 of the first compress arm 736 to compress the first latch spring 794A and force the first latch 730A down. In a similar fashion, when a force is applied to the second button 772, the second ejection member 770 will pivot about the second post 798 to compress the second latch spring 794B and force the second latch 730B down. Once a threshold level of force has been applied to each of the ejection members 750 and 770, the corresponding latches 730A and 730B will disengage from the recess (not shown) of the electrical device housing 202. Preferably, the contact tips of the ejection arms 754 and 774 will not contact the contact area 102 of the portion of an electrical device housing 100 until the associated latch 730A and 730B is disengaged from the recess (not shown).

While the invention has been described in conjunction with specific embodiments it is to be understood that many alternatives, modifications, and variations will be apparent to those skilled in the art in light of the foregoing detailed description. It is therefore intended that the foregoing description be regarded as illustrative rather than limiting, and that it be understood that it is the following claims, including all equivalents, that are intended to define the spirit and scope of this invention.

What is claimed:

1. A battery ejection mechanism for ejecting a battery housing that is removably secured to a portion of a power tool or a battery charger housing, the battery housing including a first side, a second side, a first latch movably attached thereto and a second latch movably attached thereto, the mechanism comprising a first ejection member and a second ejection member, the first ejection member comprising a first button and a first arm, wherein the first ejection member operates to transfer a mechanical force applied to the first button through the first arm to both the power tool or battery charger housing and the first latch, the second ejection member comprising a second button and a second arm, wherein the second ejection member operates to transfer a mechanical force applied to the second button through the second arm to both the power tool or battery charger housing and the second latch, wherein the first button is positioned on the first side of the battery housing and the second button is positioned on the second side of the battery housing.

2. The battery ejection mechanism of claim 1, wherein the first arm applies a mechanical force to the portion of the power tool or battery charger housing in a direction substantially perpendicular to a direction in which a mechanical force is applied to the first button.

3. The battery ejection mechanism of claim 1 further comprising a spring adapted to bias the first ejection member in a first position.

4. The battery ejection mechanism of claim 3, wherein the first position corresponds to the first arm not contacting the portion of the power tool or battery charger housing.

5. The battery ejection mechanism of claim 1, wherein the power tool or battery charger housing has at least one electrical contact and wherein the first arm is in physical contact with the portion of the power tool or battery charger housing when the mechanical force is applied to the first button.

6. The battery ejection mechanism of claim 1, wherein the first ejection member is adapted to disengage the first latch from the power tool or battery charger housing when the mechanical force is applied to the first button and the second ejection member is adapted to disengage the second latch from the power tool or batter charger housing when the mechanical force is applied to the second button.

7. The battery ejection mechanism of claim 6, wherein the first ejection member is further adapted to disengage the first latch from the power tool or battery charger housing before the force is transferred through the first arm to the electrical device housing.

8. The battery ejection mechanism of claim 1, wherein the first arm comprises a cam.

9. The battery ejection mechanism of claim 1, wherein the second side is opposite the first side.

10. The battery ejection mechanism of claim 9 further comprising at least one rail structure for facilitating the assembly of the battery housing in an operative position on the portion of the power tool or battery charger housing.

11. A battery housing comprising,
a. at least one rechargeable cell;
b. a battery housing adapted to house the at least one rechargeable cell, the battery housing having a first side and a second side;
c. at least one electrical contact electrically connected to the at least one cell;
d. a first latch movably attached to the battery housing;
e. a second latch movably attached to the battery housing;
f. a first ejection member rotatably secured to the housing and comprising a first button and a first arm wherein the first ejection member operates to transfer a mechanical force applied to the first button through the first arm to both a portion of power tool or battery charger housing and the first latch, wherein the first button is accessible via the first side; and
g. a second ejection member rotatably secured to the housing and comprising a second button and a second arm wherein the second ejection member operates to transfer a mechanical force applied to the second button through the second arm to both a portion of power tool or battery charger housing and the second latch, wherein the second button is accessible via the second side.

12. A battery ejection mechanism for ejecting a battery housing removably attached to a power tool or battery charger housing, the battery housing including a first side and a second side, the ejection mechanism comprising:
a. a first recess provided on a portion of the power tool or battery charger housing;
b. a first ejection member secured to the battery housing and comprising a first button, and a first arm, wherein the first button is accessible via the first side;
c. a second ejection member secured to the battery housing and comprising a second button, and a second arm, wherein the second button is accessible via the second side;
d. a first latch movably attached to the battery housing and adapted to engage the first recess;
e. a second latch movably attached to the battery housing and adapted to engage the first recess;
wherein the first ejection member operates to transfer a mechanical force applied to the first button through the first arm to both the power tool or battery charger housing and the first latch and the second ejection member operates to transfer a mechanical force applied to the second button through the second arm to both the power tool or battery charger housing and the second latch.

* * * * *